US006939925B2

United States Patent
Sakamoto et al.

(10) Patent No.: US 6,939,925 B2
(45) Date of Patent: Sep. 6, 2005

(54) ROOM-TEMPERATURE CURABLE ORGANOPOLYSILOXANE COMPOSITION

(75) Inventors: Takafumi Sakamoto, Usui-gun (JP); Norio Kameda, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/682,906

(22) Filed: Oct. 14, 2003

(65) Prior Publication Data

US 2004/0082736 A1 Apr. 29, 2004

(30) Foreign Application Priority Data

Oct. 25, 2002 (JP) ........................................ 2002-311456

(51) Int. Cl.$^7$ ............................................. C08L 83/00
(52) U.S. Cl. ...................... 525/477; 524/266; 524/268; 528/34
(58) Field of Search ............................ 525/477; 528/34; 524/266, 268

(56) References Cited

U.S. PATENT DOCUMENTS

| | | | | |
|---|---|---|---|---|
| 2,814,601 A | * | 11/1957 | Currie et al. | 528/18 |
| 4,143,088 A | * | 3/1979 | Favre et al. | 525/477 |
| 4,448,814 A | * | 5/1984 | Shimizu et al. | 427/387 |
| 4,831,070 A | * | 5/1989 | McInally et al. | 524/267 |
| 5,561,203 A | * | 10/1996 | Strong et al. | 525/477 |
| 5,905,123 A | * | 5/1999 | Cifuentes et al. | 525/477 |

FOREIGN PATENT DOCUMENTS

| EP | 0 628 618 | 12/1994 |
|---|---|---|
| EP | 0 776 944 | 6/1997 |
| EP | 1 258 508 | 11/2002 |

* cited by examiner

*Primary Examiner*—Robert E. L. Sellers
*Assistant Examiner*—Marc S Zimmer
(74) *Attorney, Agent, or Firm*—Oblon, Spivak, McClelland, Maier & Neustadt, P.C.

(57) ABSTRACT

Provided is a room-temperature curable organopolysiloxane composition including (I) an organopolysiloxane, and (II) a silane compound containing silicon-bonded hydrolysable groups and/or a partial hydrolysis-condensation product thereof. The organopolysiloxane (I) is a condensation product of (A) an organosiloxane which includes $R_3SiO_{1/2}$ units wherein R represents an unsubstituted or substituted monovalent hydrocarbon group and $SiO_{4/2}$ units, in which the molar ratio $R_3SiO_{1/2}$ to $SiO_{4/2}$ is 0.6 to 1.2, and further includes less than 2.0% by weight of silicon-bonded hydroxyl groups, and (B) a diorganopolysiloxane with molecular chain terminals blocked with functional group-containing silyl groups. This composition generates a cured product or coating film with good transparency and good strength, which is useful as a coating material for electrical or electronic components or circuits, a sealant for liquid crystal display elements, and an antifouling paint for underwater structures.

4 Claims, No Drawings

US 6,939,925 B2

ROOM-TEMPERATURE CURABLE ORGANOPOLYSILOXANE COMPOSITION

BACKGROUND OF THE INVENTION

1. Field of the Invention

The present invention relates to a room-temperature curable organopolysiloxane composition that generates a cured product or coating film with good transparency and good strength, and in particular relates to a room-temperature curable organopolysiloxane composition that is ideal for use as a coating material for electrical or electronic components or circuits, a sealant for liquid crystal display elements, and a paint that generates an antifouling coating, which is applied to underwater structures to prevent the adhesion and growth of aquatic organisms on the surface of such structures. In this specification, "underwater structures" means ships, port installations, buoys, pipelines, bridges, undersea bases, seabed oil field excavation equipment, water supply pipes for power generation stations, nets for aquatic farming, and fixed nets and the like.

2. Description of the Prior Art

Conventionally, many room-temperature curable silicone rubber compositions which generate rubber like elastic bodies at room temperature are already known. Cured rubbers obtained from room-temperature curable silicone rubber compositions (hereafter referred to as "RTV") display superior weather resistance, durability, heat resistance and cold resistance when compared with other organic-based rubbers, and are consequently used in a variety of fields, particularly within the field of construction, where they are used for a variety of applications including as adhesives for bonding glass together, adhesives between metals and glass, and as sealants between masonry joints. Furthermore, because of their adhesion to adherends such as epoxy resins, alcohol-elimination type RTVs tend to be widely used for bonding and coating electrical or electronic components. In recent years, alcohol-elimination type RTVs have also been widely applied as sealants for liquid crystal display elements, which are being produced in rapidly increasing numbers.

Conventional RTVs have basically satisfied performance requirements for factors such as insulation and dust prevention of electrical or electronic components or circuits. However, with recent moves to even more finely detailed circuit design, RTV coating films with greater strength are now being sought. A material capable of adequately meeting these requirements, which requires no solvent, and generates a cured product or coating with good transparency and superior strength has not been available.

On the other hand, in recent years, RTVs have become widely used as coatings for building structures, production plants, the internal surfaces of water pipes, and the external surfaces of water pipes and the like. Furthermore, countermeasures for preventing the adhesion and growth of aquatic organisms on underwater structures have involved the application of an antifouling paint containing a toxic antifouling agent such as an organotin compound or cuprous oxide to the structure. However, although such measures substantially prevented the adhesion and growth of any aquatic organisms, because a toxic antifouling agent was used, the environmental, safety, and hygiene conditions during production and application of the paint were undesirable, and furthermore when placed in the water, the toxic antifouling agent was gradually eluted from the paint film, meaning that when viewed over an extended period, there was a danger of polluting the water environment, and as a result the use of such antifouling paints has now been banned by law.

In contrast, non-toxic antifouling paints that exhibit antifouling properties by lowering the surface tension of the paint film have been proposed as paints that can prevent the adhesion and growth of aquatic organisms, and yet contain no toxic antifouling agents. For example, the combining of liquid paraffin, petrolatum, or a mixture of liquid paraffin and petrolatum with a RTV has been proposed (Japanese Laid-open Patent publication (kokai) No. 58-13673 (JP58-13673A), Laid-open Patent publication (kokai) No. 62-84166(JP62-84166A)).

Furthermore, non-toxic antifouling paint compositions which utilize the volumetric shrinkage accompanying the curing of a reaction curing type silicone resin, so that a silicone resin containing an unreactive polar group and with poor compatibility bleeds out to the surface, thereby combining antifouling properties with the low surface tension of the reaction curing type silicone resin, have also been proposed. In other words, the use of resins in which a polar group selected from amongst amino groups, carboxyl groups, epoxy groups and polyoxyethylene groups with hydroxyl group terminals is bonded to a silicon atom via a bivalent aliphatic hydrocarbon group (Japanese Patent publication No. 2503986 (JP2503986B)), and the use of silicone resins with an alkoxy group introduced at a molecular terminal silicon atom via an ethylene oxide or propylene oxide group (Japanese Patent publication No. 2952375 (JP2952375B)) as the silicone resin containing an unreactive polar group have already been proposed. However, these resins were still unable to provide satisfactory performance in terms of the long term endurance of the antifouling properties.

SUMMARY OF THE INVENTION

Taking the prior art described above into consideration, an object of the present invention is to provide a room-temperature curable organopolysiloxane composition, which yields a cured product with good transparency and superior strength, and is consequently ideal for use as a coating material for electrical or electronic components or circuits, and as a sealant for liquid crystal display elements, and furthermore when applied to underwater structures generates an antifouling coating that displays superior long term endurance of the preventative effect on the adhesion and growth of aquatic organisms.

As a result of intensive investigations aimed at achieving the above object, the inventors of the present invention were able to complete the present invention.

In other words, the present invention provides a room-temperature curable organopolysiloxane composition comprising:

(I) 100 parts by weight of an organopolysiloxane that is a condensation reaction product of 100 parts by weight of a component (A) described below, and from 1 to 200 parts by weight of a component (B) described below, (A) an organopolysiloxane which comprises from $R_3SiO_{1/2}$ units (wherein, each R represents, independently, an unsubstituted or substituted monovalent hydrocarbon group of 1 to 6 carbon atoms) and $SiO_{4/2}$ units, in which a number of mols of said $R_3SiO_{1/2}$ units relative to 1 mol of said $SiO_{4/2}$ units is from 0.6 to 1.2 mols, and which may further comprises from 0 to 1.0 mols of both $R_2SiO_{2/2}$ units and $RSiO_{3/2}$ units (wherein in each formula, R is as defined above) relative to 1 mol of said $SiO_{4/2}$ units, and moreover comprises less than 2.0% by weight of hydroxy groups bonded to silicon atoms, (B) a diorganopolysiloxane with molecular chain terminals blocked with functional group-containing silyl groups; and (II) from 0.1 to 30 parts by weight of a silane compound containing two or more hydrolysable groups bonded to silicon atoms within one molecule, and/or a partial hydrolysis-condensation product thereof.

DETAILED DESCRIPTION OF THE PREFERRED EMBODIMENTS

As follows is a more detailed description of the present invention.

[Component (I)]

The component (I) of the present invention, which is an organopolysiloxane that is a condensation reaction product of a component (A) and a component (B) described above, is the most important component in characterizing the present invention.

Conventionally, room-temperature curable organopolysiloxane compositions in which the component (A) and the component (B) have been added individually are already known, but room-temperature curable organopolysiloxane compositions in which a condensation reaction product, produced by first subjecting the two components to a condensation reaction, is added as a composition component are unknown. The inventors of the present invention varied the relative composition of the component (A) and the component (B), the condensation reaction conditions, and the relative proportions of the reaction raw materials, while checking the physical properties of the cured product produced using the condensation reaction product obtained via the condensation reaction, and discovered that by selecting a specific composition and weight ratio range, and employing the product obtained through a condensation reaction of the two components, the physical properties such as the strength of the cured product improved markedly.

<Component (A)>

The component (A) is an organopolysiloxane which comprises $R_3SiO_{1/2}$ units (wherein, each R represents, independently, an unsubstituted or substituted monovalent hydrocarbon group of 1 to 6 carbon atoms) and $SiO_{4/2}$ units, in which the number of mols of the $R_3SiO_{1/2}$ units relative to 1 mol of the $SiO_{4/2}$ units is from 0.6 to 1.2 mols, and which may further comprise from 0 to 1.0 mols of both $R_2SiO_{2/2}$ units and $RSiO_{3/2}$ units (wherein in each formula, R is as defined above) relative to 1 mol of the $SiO_{4/2}$ units, and moreover comprises less than 2.0% by weight of hydroxy groups bonded to silicon atoms.

Examples of the aforementioned group R include alkyl groups such as methyl groups, ethyl groups, n-propyl groups, isopropyl groups, n-butyl groups, iso-butyl groups, tert-butyl groups, pentyl groups, and hexyl groups; cycloalkyl groups such as cyclopentyl groups and cyclohexyl groups; alkenyl groups such as vinyl groups, allyl groups, isopropenyl groups, butenyl groups, pentenyl groups and hexenyl groups; aryl groups such as phenyl groups; and halogenated alkyl groups such as chloromethyl groups, 3-chloropropyl groups, 1-chloro-2-methylpropyl groups, and 3,3,3-trifluoropropyl groups, and of these, methyl groups, vinyl groups and phenyl groups are preferred, and methyl groups are particularly preferred.

The organopolysiloxane of the aforementioned component (A) can be obtained by known methods, by performing a cohydrolysis-condensation, in an organic solvent, of alkoxy group-containing silane compounds that correspond with each of the above units, thereby yielding a product with essentially no volatile fraction. For example, $R_3SiOMe$ and $Si(OMe)_4$, optionally together with $R_2Si(OMe)_2$ and/or $RSi(OMe)_3$ if desired, can be subjected to a cohydrolysis-condensation in an organic solvent (wherein, in each of the above formulas, each R is, independently, as defined above, and Me represents a methyl group).

The aforementioned organic solvent is preferably a solvent capable of dissolving the organopolysiloxane produced by the cohydrolysis-condensation reaction, and typical examples include toluene, xylene, methylene chloride, and naphtha mineral spirit. Furthermore, in the present invention, the above organic solvent may also be omitted, and a diorganopolysiloxane of the component (B) described below, with a viscosity at 25° C. of 20 to 2,000 mm²/s, may be used instead.

The molar ratio of each of the units of the aforementioned component (A) can be appropriately set by adjusting the molar ratio of the added methoxysilane compounds corresponding with each of the units, for example.

The number of mols of the $R_3SiO_{1/2}$ units relative to 1 mol of the $SiO_{4/2}$ units in the component (A) must be within a range from 0.6 to 1.2 mols, and is preferably within a range from 0.65 to 1.15 mols. If the number of mols is less than 0.6 mols, the strength of the cured product obtained from the composition of the present invention is inadequate, whereas if the number exceeds 1.2 mols, a product of inferior transparency is produced.

Furthermore, the upper limit for the quantity of the aforementioned $R_2SiO_{2/2}$ units and $RSiO_{3/2}$ units, which may be optionally included within the component (A) if desired, is 1.0 mol per 1 mol of the $SiO_{4/2}$ units in both cases, and a value from 0.2 to 0.8 mols is preferred. If either of the quantities exceeds 1.0 mols, a product of inferior transparency is produced.

During preparation of the aforementioned component (A) by the cohydrolysis-condensation reaction, hydroxy groups bonded to silicon atoms are produced. Incorporation of these hydroxy groups is necessary for the condensation reaction with the aforementioned component (B), but the content of these hydroxy groups within the component (A) must be less than 2.0% by weight, whereas the lower limit is preferably at least 0.1% by weight. Values from 0.2 to 1.8% by weight are particularly preferred. The hydroxy group content can be set by adjusting the conditions of the cohydrolysis-condensation reaction. If the aforementioned content is 2.0% by weight or greater, then the hardness of the cured product obtained from the composition of the present invention becomes overly high, and there is a loss in rubber elasticity. Furthermore, if the content is too low, then the strength of the cured product obtained from the composition of the present invention may be inadequate.

<Component (B)>

The component (B) which undergoes a condensation reaction with the aforementioned component (A) is a diorganopolysiloxane with the molecular chain terminals blocked with functional group-containing silyl groups, and the use of a diorganopolysiloxane represented by a general formula (1) shown below:

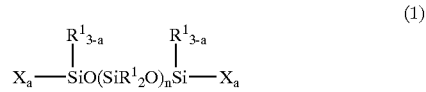

(1)

(wherein, each $R^1$ represents, independently, an unsubstituted or substituted monovalent hydrocarbon group of 1 to 10 carbon atoms, each X represents, independently, a functional group, a is an integer from 1 to 3, and n is an integer of 10 or greater) is particularly preferred.

Examples of the aforementioned group $R^1$ include alkyl groups such as methyl groups, ethyl groups, n-propyl groups, isopropyl groups, n-butyl groups, iso-butyl groups, tert-butyl groups, pentyl groups, hexyl groups, heptyl groups, octyl groups, nonyl groups, and decyl groups; cycloalkyl groups such as cyclopentyl groups and cyclohexyl groups; alkenyl groups such as vinyl groups, allyl groups, isopropenyl groups, butenyl groups, pentenyl groups and hexenyl groups; aryl groups such as phenyl groups, tolyl groups, xylyl groups and naphthyl groups; aralkyl groups such as benzyl groups, phenethyl groups and phenylpropyl groups; and halogenated alkyl groups such as chloromethyl groups, 3-chloropropyl groups, 1-chloro-2-methylpropyl groups, and 3,3,3-trifluoropropyl groups, and of these, methyl groups are preferred.

There are no particular restrictions on the functional group X, which represents a terminal group of the aforementioned diorganopolysiloxane, provided it is capable of undergoing a condensation reaction with a hydroxy group bonded to a silicon atom within the aforementioned component (A), and suitable examples include a variety of hydrolysable groups, including hydroxy groups; as well as alkoxy groups such as methoxy groups, ethoxy groups, propoxy groups and butoxy groups; alkoxyalkoxy groups such as methoxyethoxy groups, ethoxyethoxy groups and methoxypropoxy groups; alkenyloxy groups such as vinyloxy groups, isopropenyloxy groups and isobutenyloxy groups; ketoxime groups such as dimethylketoxime groups, methylethylketoxime groups, diethylketoxime groups and cyclohexanoxime groups; acyloxy groups such as acetoxy groups, propionyloxy groups, butyryloxy groups, octanoyloxy groups and benzoyloxy groups; aminoxy groups such as N,N-dimethylaminoxy groups and N.N-diethylaminoxy groups; amino groups such as dimethylamino groups, diethylamino groups, butylamino groups and cyclohexylamino groups; and amide groups such as N-methylacetamide groups, N-ethylacetamide groups and N-methylbenzamide groups, and of these, hydroxy groups and alkoxy groups are preferred, and hydroxy groups are particularly preferred.

In the above formula, n is an integer of 10 or greater, but is preferably a number that results in a fluid diorganopolysiloxane with a viscosity at 25° C. of no more than 300,000 mm²/s, and preferably within a range from 50 to 10,000 mm²/s.

Specific examples of diorganopolysiloxanes represented by the above general formula (1) include polydimethylsiloxane with both molecular chain terminals blocked with silanol groups, copolymers of dimethylsiloxane and methylphenylsiloxane with both molecular chain terminals blocked with silanol groups, polydimethylsiloxane with both molecular chain terminals blocked with trimethoxysiloxy groups, copolymers of dimethylsiloxane and methylphenylsiloxane with both molecular chain terminals blocked with trimethoxysiloxy groups, polydimethylsiloxane with both molecular chain terminals blocked with methyldimethoxysiloxy groups, and polydimethylsiloxane with both molecular chain terminals blocked with triethoxysiloxy groups. These materials can be used singularly, or in combinations of two or more materials.

<Condensation Reaction between Component (A) and Component (B)>

The component (I) of a composition of the present invention can be produced by a condensation reaction, using from 1 to 200 parts by weight, and preferably from 5 to 150 parts by weight, and even more preferably from 70 to 120 parts by weight of the aforementioned component (B), relative to 100 parts by weight of the aforementioned component (A). If the quantity used of the component (B) is less than 1 part by weight, then the cured product obtained from the composition of the present invention does not have high strength and rubber elasticity, whereas if more than 200 parts by weight is used, then once again the rubber elasticity is lost. As described above, if during the production of the component (A), the component (B) is used instead of an organic solvent, then provided the quantity conditions described above are satisfied, additional component (B) need not be added.

In the condensation reaction between the component (A) and the component (B), the use of a condensation reaction catalyst is preferred. Suitable examples of the condensation reaction catalyst include titanium compounds, tin compounds, amine compounds, and alkali metal compounds, although amine compounds are preferred, and specific examples include ethylamine, propylamine, isopropylamine, butylamine, diethylamine, dibutylamine, triethylamine, and ammonia water. There are no particular restrictions on the quantity used of the condensation reaction catalyst, and an effective catalytic quantity is adequate, although typically, quantities from 0.05 to 3.0 parts by weight per 100 parts by weight of the combined component (A) and component (B) are suitable.

Furthermore, there are no particular restrictions on the condensation reaction temperature, although typical values are within a range from 1 to 120° C., and preferably from 10 to 80° C. There are also no particular restrictions on the reaction time, although 10 to 18 minutes is sufficient.

Following completion of the condensation reaction, where necessary, the solvent and/or unreacted organopolysiloxane or diorganopolysiloxane may be removed by distillation. Furthermore, in order to further adjust the viscosity of the condensation reaction product, organopolysiloxanes with the terminals blocked with trimethylsiloxy groups or vinyl groups or the like, low molecular weight cyclic siloxanes such as octamethylcyclotetrasiloxane, aliphatic hydrocarbons, aromatic hydrocarbons, liquid paraffin or isoparaffin or the like may also be added. The use of compounds with a viscosity at 25° C. of 5 to 1,000 mm²/s as the components that are added to adjust the viscosity is effective.

[Component (II)]

The component (II) of a composition of the present invention is a silane compound containing on average 2 or more hydrolysable groups bonded to silicon atoms within 1 molecule, and/or a partial hydrolysis-condensation product thereof. Examples of the aforementioned hydrolysable group include those groups, other than hydroxy groups, listed in relation to X of the general formula (1) of the aforementioned component (B).

Specific examples of the component (II) include a variety of silanes, including ketoxime silanes such as methyltris(dimethylketoxime)silane, methyltris(methylethylketoxime)silane, ethyltris(methylethylketoxime)silane, methyltris(methylisobutylketoxime)silane, and vinyltris(methylethylketoxime)silane; alkoxysilanes such as methyltrimethoxysilane and vinyltrimethoxysilane; alkenoxysilanes such as methyltriisopropenoxysilane; and acetoxysilanes such as methyltriacetoxysilane and vinyltriacetoxysilane; as well as partial hydrolysis-condensation products thereof. These compounds can be used singularly, or in combinations of two or more compounds.

The quantity added of the component (II) is within a range from 0.1 to 30 parts by weight, and preferably from 1 to 15 parts by weight, per 100 parts by weight of the component (I) described above. If the quantity added is less than 0.1 parts by weight, sufficient cross linking and curing does not occur, meaning a cured product with rubber elasticity is not obtained, whereas if the quantity exceeds 30 parts by weight, a cured product of inferior mechanical characteristics is produced.

In a composition of the present invention, a condensation reaction catalyst may also be combined with the aforementioned component (I) and component (II). Suitable examples of the condensation reaction catalyst include organotitanium compounds such as tetraisopropoxytitanium, tetrabutoxytitanium, and titanium bisacetylacetonate; strong bases such as tetramethylguanidine, tetramethylguanidylpropyltrimethoxysilane, and γ-aminopropyltriethoxysilane; and metal carboxylates such as zinc octanoate, lead 2-ethylhexanoate, dibutyltin diacetate, dibutyltin dilactate, stannous octanoate, zinc naphthenate, and ferrous octanoate. In cases where this type of condensation reaction catalyst is added, there are no particular restrictions on the quantity, and an effective catalytic quantity is adequate, although typically, quantities from 0.01 to 5 parts by weight, and preferably from 0.05 to 3 parts by weight, per 100 parts by weight of the component (I) are suitable.

[Components (III), (IV)]

In addition to the aforementioned components (I) and (II), from 1 to 200 parts by weight of:
(III) an organopolysiloxane containing from 3 to 50 mol %, and preferably from 5 to 25 mol %, of phenyl groups, and with the molecular chain terminals blocked with trialkylsiloxy groups and/or functional group-containing silyl groups, or
(IV) an organopolysiloxane containing a group with a polyoxyalkylene structure, with the molecular chain terminals blocked with trialkylsiloxy groups and/or functional group-containing silyl groups, and having an HLB value of 1 to 8, or a mixture of the components (III) and (IV), relative to 100 parts by weight of the component (I), may also be added to a composition of the present invention. These components are preferably added in those cases in which the composition of the present invention is applied to an antifouling paint for an underwater structure. By adding at least one of the component (III) and the component (IV), usually either the component (III) or (IV), the performance of the cured paint film formed from the composition of the present invention in preventing the adhesion and growth of aquatic organisms can be further improved.

Use of an organopolysiloxane represented by a general formula (2) shown below as the aforementioned component (III) is preferred.

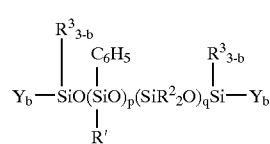

(2)

(wherein, R' represents a phenyl group or a methyl group, each $R^2$ represents, independently, an unsubstituted or substituted monovalent hydrocarbon group of 1 to 10 carbon atoms, with the exception of phenyl groups, each $R^3$ represents, independently, an alkyl group of 1 to 8 carbon atoms, each Y represents, independently, a functional group, b is an integer from 0 to 3, p and q each represent an integer of 1 or greater, the sum of p+q is an integer of 10 or greater, and p represents a number which results in a phenyl group content of 3 to 50 mol %)

The sum of p+q is preferably a number that results in a viscosity at 25° C. within a range from 20 to 5000 $mm^2/s$.

Suitable examples of the group $R^2$ include all those groups listed in relation to the group $R^1$ of the general formula (1) of the aforementioned component (B), with the exception of phenyl groups.

Suitable examples of the group $R^3$ include the alkyl groups of 1 to 8 carbon atoms among those groups listed in relation to the group $R^1$ of the general formula (1) of the aforementioned component (B).

Suitable examples of the functional group Y include all those groups listed in relation to the group X of the general formula (1) of the aforementioned component (B), with the exception of hydroxy groups.

If the phenyl group content of this component (III) is too low, then because the compatibility is good, the component is less likely to bleed out from the cured product, whereas if the content is too high, the compatibility is poor, and the component tends to separate out rapidly, and in either case, the preventative effect on the adhesion of aquatic organisms may be inadequate.

Specific examples of the aforementioned component (III) include phenyl group-containing silicone oils such as copolymers of methylphenylsiloxane and dimethylsiloxane with both terminals blocked with trimethylsiloxy groups, and copolymers of diphenylsiloxane and dimethylsiloxane with both terminals blocked with trimethylsiloxy groups. These materials can be used singularly, or in combinations of two or more materials.

Use of an organopolysiloxane with a structure represented by a general formula (3) shown below:

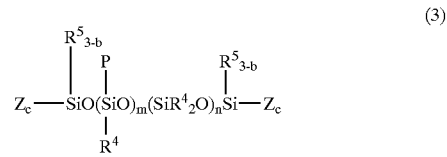

(3)

(wherein, each $R^4$ represents, independently, an unsubstituted or substituted monovalent hydrocarbon group of 1 to 10 carbon atoms, each $R^5$ represents, independently, an alkyl group of 1 to 8 carbon atoms, P represents a monovalent group with a polyoxyalkylene structure, each Z represents, independently, a functional group, each c is independently an integer from 0 to 3, m is an integer of 1 or greater, and preferably from 2 to 10, n is an integer of 1 or greater, and preferably from 10 to 1000, and the sum of m+n is an integer of 10 or greater), and with an HLB value of 1 to 8, and preferably from 2 to 7, as the aforementioned component (IV), is preferred. The sum of m+n is preferably a number that results in a viscosity at 25° C. within a range from 20 to 5000 $mm^2/s$.

Suitable examples of the group $R^4$ include those groups listed as examples in relation to the $R^1$ of the general formula (1) of the aforementioned component (B).

Suitable examples of the $R^5$ include the alkyl groups of 1 to 8 carbon atoms among those groups listed as examples in relation to the $R^1$ of the general formula (1) of the aforementioned component (B).

Examples of the functional group of the Z include all those groups listed as examples in relation to the X of the general formula (1) of the aforementioned component (B), with the exception of hydroxy groups.

Suitable examples of the aforementioned group P with a polyoxyalkylene structure include groups represented by a formula (4) shown below.

$$-O(C_sH_{2s}O)_uR^6 \quad (4)$$

(wherein, $R^6$ represents an unsubstituted or substituted monovalent hydrocarbon group of 1 to 10 carbon atoms, and s is an integer from 1 to 8, and preferably from 2 to 4, and u is an integer from 1 to 30, and preferably from 2 to 25, provided that when u is an integer of at least 2, the value of s in the plurality of structures within ( ) may be the same or different.)

Examples of the $R^6$ include those groups listed as examples in relation to the $R^1$ of the general formula (1) of the aforementioned component (B). Specific examples of the P include groups with a polyoxyethylene, polyoxypropylene or polyoxytetramethylene structure, and polyoxyethylene (ethylene oxide) and polyoxypropylene (propylene oxide) are preferred.

If the HLB value of the component (IV) is too small or too large, then the preventative effect on the adhesion of aquatic organisms may be inadequate.

Specific examples of the aforementioned component (IV) include silicone oils modified with polyether at side chains and/or both terminals and/or one terminal, and having as terminal groups silanol groups, trimethylsiloxy groups, trimethoxysiloxy groups, triethoxysiloxy groups, methyldimethoxysiloxy groups, or methyldi(methylethylketoxime)siloxy groups or the like. Such a material can be used singularly or a combination of two or more.

[Other Components]

In addition to the components (I) and (II) described above, typical known fillers, additives and catalysts and the like may also be added to a composition of the present invention. Examples of fillers include crushed silica, fumed silica, calcium carbonate, zinc carbonate, and wet process silica. Other components include thixotropic improvement agents such as polyethers, mold resistance agents, antibacterial agents, and adhesion assistants including aminosilanes such as γ-aminopropyltriethoxysilane and 3-[2-(aminoethylamino)propyl]trimethoxysilane; and epoxysilanes such as γ-glycidylpropyltrimethoxysilane and β-(3,4-epoxycyclohexyl)ethyltrimethoxysilane.

[Preparation of Compositions]

If the aforementioned component (I) and component (II) of a composition of the present invention are present together with a condensation reaction catalyst then the curing reaction starts at room temperature, and consequently in those cases in which a condensation reaction catalyst is used, it is desirable that during preparation of the composition of the present invention, first the organopolysiloxane of the component (I) and the silane compound and/or partial hydrolysis-condensation product thereof of the component (II) are mixed together, together with any other added components if necessary, and once this mixture has been produced and preparation for the curing reaction is complete, the condensation reaction catalyst is then added and mixed into the mixture.

EXAMPLES

As follows, the present invention is described in more detail using examples, although the present invention is in no way restricted by these examples.

In the synthetic examples and the examples, all references to "parts" refer to parts by weight.

Synthetic Example 1

Preparation of Component (I)

A 4 neck separable flask equipped with a thermometer, a stirrer, a reflux condenser and a nitrogen inlet tube was internally replaced with nitrogen. Subsequently, (A) the number of parts shown in Table 1 of a solution produced by dissolving in toluene an organopolysiloxane comprising $(CH_3)_3SiO_{1/2}$ units and $SiO_{4/2}$ units, in which $(CH_3)_3SiO_{1/2}$ units/$SiO_{4/2}$ units (molar ratio)=0.74, and having a content of hydroxy groups bonded to silicon atoms of 1.62% by weight, to form a solution with a solid content of 50% by weight, and (B) the number of parts shown in Table 1 of a dimethylpolysiloxane with both terminals blocked with silanol groups and with a viscosity at 25° C. as shown in Table 1, were stirred together to produce a uniform mixture, and 0.5 parts of ammonia water were then added dropwise, and the condensation reaction was allowed to proceed for 12 hours at 20° C. Subsequently, with heating at 120° C., the toluene and any low molecular weight by-products were removed, yielding a component (I) from No. 1 to No. 6.

TABLE 1

| | Component (I) No. | | | | | |
|---|---|---|---|---|---|---|
| | 1 | 2 | 3 | 4 | 5 | 6 |
| Component (A) (solution) parts | 60 | 100 | 140 | 100 | 100 | 100 |
| Component (B) viscosity (mm²/s) | 20,000 | 20,000 | 20,000 | 700 | 5,000 | 50,000 |
| Component (B) parts | 70 | 50 | 30 | 50 | 50 | 50 |

Synthetic Example 2

Preparation of Mixtures for Comparison

Following the method described for the synthetic example 1, but without conducting the condensation reaction described in the synthetic example 1, the components (A) and the components (B) shown in Table 2 were simply weighed out and mixed together uniformly, and subsequently, with heating at 120° C., the toluene was removed, yielding mixtures (for comparison) from No. 7 to No. 10.

TABLE 2

| | Mixture No. | | | |
|---|---|---|---|---|
| | 7 | 8 | 9 | 10 |
| Component (A) (solution) parts | 0 | 60 | 100 | 140 |
| Component (B) viscosity (mm²/s) | 20,000 | 20,000 | 20,000 | 20,000 |
| Component (B) parts | 100 | 70 | 50 | 30 |

Examples 1 to 7,

Comparative Examples 1 to 4

100 parts of a component (I) (No. 1 to No. 6) obtained in the synthetic example 1 was mixed with a quantity of vinyltris(methylethylketoxime)silane shown in Table 3 as the component (II), and 1 part of γ-aminopropyltriethoxysilane until a uniform mixture was obtained, thereby completing preparation of a composition No. 1 to 6.

Furthermore, 100 parts of the component (1) No. 2 obtained in the synthetic example 1 was mixed with a quantity of vinyltris(methylethylketoxime)silane shown in Table 3 as the component (II), 1 part of γ-aminopropyltriethoxysilane, and 0.5 parts of dibutyltin dioctoate until a uniform mixture was obtained, thereby completing preparation of a composition No. 7.

100 parts of a mixture (for comparison) (No. 7 to No. 10) obtained in the synthetic example 2 was mixed with a quantity of vinyltris(methylethylketoxime)silane shown in Table 4 as the component (II), and 1 part of γ-aminopropyltriethoxysilane until a uniform mixture was obtained, thereby completing preparation of a composition No. 8 to 11 (for comparison).

Subsequently, each of the compositions obtained above was molded into a sheet of thickness 2 mm, and then left to stand for 1 week under conditions of 23±2° C. and 50±5% RH to cure. The physical properties of each of these cured sheets was measured in accordance with JIS K 6249. The results are shown in Table 3 and Table 4.

Example 8,

Comparative Example 5

70 parts by weight of separate samples of the composition No. 2 from the aforementioned example 2, and the composition No. 10 from the comparative example 3, were each uniformly mixed with 30 parts by weight of a copolymer of methylphenylsiloxane and dimethylsiloxane with both molecular chain terminals blocked with trimethylsiloxy groups, containing 5 mol % of phenyl groups and with a viscosity at 25° C. of 100 mm$^2$/s, thereby completing preparation of compositions.

Example 9,

Comparative Example 6

70 parts by weight of separate samples of the composition No. 2 from the aforementioned example 2, and the composition No. 10 from the comparative example 3, were each uniformly mixed with 30 parts by weight of a dimethylpolysiloxane with a polyoxyethylene group as a side chain, a viscosity at 25° C. of 100 mm$^2$/s, both molecular chain terminals blocked with trimethylsiloxy groups, and with an HLB value of 2, thereby completing preparation of compositions.

[Evaluation of Aquatic Organism Antifouling Performance]

Each of the compositions obtained in the aforementioned examples 8 and 9, and the comparative examples 4 and 5 was applied to a coated plate that had already been coated with an epoxy-based anticorrosive paint (film thickness 200 μm), in sufficient quantity to produce an additional cured film of 300 μm, thereby forming a coated test plate, which was then left to stand for one week in an atmosphere of 23° C. and 50% RH to cure. These coated test plates were fixed in the sea off the coast of Mie prefecture in Japan at a depth of 1.5 m, and were left submerged for a period of 12 months for testing. After 3 months, after 6 months, and after 12 months, the coated test plates were raised, and the state of the film, and the degree of adhesion of shellfish such as barnacles, and seaweeds was evaluated by visual inspection. The results of those evaluations are shown in Table 5.

TABLE 3

|  | Example 1 | Example 2 | Example 3 | Example 4 | Example 5 | Example 6 | Example 7 |
|---|---|---|---|---|---|---|---|
| Composition No. | 1 | 2 | 3 | 4 | 5 | 6 | 7 |
| Component (I) No. | 1 | 2 | 3 | 4 | 5 | 6 | 2 |
| Component (I) parts | 100 | 100 | 100 | 100 | 100 | 100 | 100 |
| Component (II) parts | 6.2 | 9.8 | 13.4 | 10.3 | 10.0 | 9.7 | 9.8 |
| Hardness | 32 | 65 | 93 | 62 | 65 | 67 | 66 |
| Breaking extension (%) | 440 | 600 | 500 | 250 | 470 | 790 | 580 |
| Tensile strength (MPa) | 3.8 | 4.6 | 4.1 | 4.6 | 4.4 | 4.5 | 4.7 |

(Note) The component (II) in the table is vinyltris(methylethylketoxime)silane. Each composition also contains 1 part of γ-aminopropyltriethoxysilane. The composition No. 7 also contains 0.5 parts of dibutyltin dioctoate.

TABLE 4

|  | Comparative Example 1 | Comparative Example 2 | Comparative Example 3 | Comparative Example 4 |
|---|---|---|---|---|
| Composition No. | 8 | 9 | 10 | 11 |
| Mixture No. | 7 | 8 | 9 | 10 |
| Mixture parts | 100 | 100 | 100 | 100 |
| Component (II) parts | 0.8 | 11.8 | 19.2 | 26.5 |
| Hardness | 6 | 19 | 53 | 46 |
| Breaking extension (%) | 490 | 530 | 490 | 430 |
| Tensile strength (MPa) | 0.2 | 1.2 | 1.3 | 1.0 |

TABLE 5

|  | Example 8 | Example 9 | Comparative example 5 | Comparative example 6 |
|---|---|---|---|---|
| State of film after 3 months | No cracking | No cracking | No cracking | No cracking |
| State of adhesion after 3 months | No adhesion at all | No adhesion at all | A little adhesion | No adhesion at all |
| State of film after 6 months | No cracking | No cracking | Slight cracking | Slight cracking |
| State of adhesion after 6 months | No adhesion at all | No adhesion at all | A little adhesion | A little adhesion |
| State of film after 12 months | No cracking | No cracking | Cracking | Cracking |

TABLE 5-continued

|  | Example 8 | Example 9 | Comparative example 5 | Comparative example 6 |
| --- | --- | --- | --- | --- |
| State of adhesion after 12 months | No adhesion at all | No adhesion at all | Large quantity of adhesion | Large quantity of adhesion |

[Evaluations]

Comparing the examples 1 to 7 and the comparative examples 1 to 4 it is evident that the cured products of the examples containing an aforementioned component (I), which is a condensation reaction product of the component (A) and the component (B), display a markedly superior tensile strength to the cured products of the comparative examples, which used a simple mixture of the component (A) and the component (B), meaning a product of greater strength can be obtained.

Furthermore, comparing the results for the examples 8 and 9 with those of the comparative examples 5 and 6 it is evident that from the viewpoints of the state of the film and the degree of adhesion of barnacles and the like, the products from the examples are markedly superior in terms of durability and aquatic organism antifouling performance, as well as the long term endurance of these effects.

A room-temperature curable organopolysiloxane composition of the present invention generates a cured product or coating film with good transparency and good strength, and is particularly ideal for use as a coating material for electrical or electronic components or circuits, a sealant for liquid crystal display elements, and an antifouling paint for underwater structures.

What is claimed is:

1. A room-temperature curable organopolysiloxane composition comprising:
   (I) 100 parts by weight of an organopolysiloxane that is a condensation reaction product of 100 parts by weight of a component (A) described below, and from 1 to 200 parts by weight of a component (B) described below,
      (A) an organopolysiloxane which comprises from $R_3SiO_{1/2}$ units (wherein, each R represents, independently, an unsubstituted or substituted monovalent hydrocarbon group of 1 to 6 carbon atoms) and $SiO_{4/2}$ units, in which a number of mols of said $R_3SiO_{1/2}$ units relative to 1 mol of said $SiO_{4/2}$ units is from 0.6 to 1.2 mols, and which further comprises both $R_2SiO_{2/2}$ units and $RSiO_{3/2}$ units (wherein in each formula, R is as defined above), and the quantities of both of the $R_2SiO_{2/2}$ units and $RSiO_{3/2}$ units are each within a range from 0.2 to 0.8 mols relative to 1 mol of said $SiO_{4/2}$ units, and moreover comprises less then 2.0% by weight of hydroxyl groups bonded to silicon atoms,
      (B) a diorganopolysiloxane with molecular chain terminals blocked with functional group-containing silyl groups; and
   (II) from 0.1 to 30 parts by weight of a silane compound containing two or more hydrolysable groups bonded to silicon atoms within one molecule, and/or a partial hydrolysis-condensation product thereof.

2. A room-temperature curable organopolysiloxane composition comprising:
   100 parts by weight of an organopolysiloxane that is condensation reaction product of 100 parts by weight of a component (A) described below, and from 1 to 200 parts by weight of a component (B) described below,
      (A) an organopolysiloxane which comprises from $R_3SiO_{1/2}$ units (wherein, each R represents, independently, an unsubstituted or substituted monovalent hydrocarbon group of 1 mol of said $SiO_{4/2}$ units, in which a number of mols of said $R_3SiO_{1/2}$ units relative to 1 mol of said $SiO_{4/2}$ units is from 0.6 to 1.2 mols, and which may further comprise from 0 to 1.0 mols of both $R_2SiO_{2/2}$ units and $RSiO_{3/2}$ units (wherein in each formula, R is as defined above) relative to 1 mol of said $SiO_{4/2}$ units, and moreover comprises less than 2.0% by weight of hydroxyl groups bonded to silicon atoms,
      (B) a diorganopolysiloxane with molecular chain terminals blocked with functional group-containing silyl groups;
   (II) from 0.1 to 30 parts by weight of a silane compound containing two or more hydrolysable groups bonded to silicon atoms within one molecule, and/or a partial hydrolysis-condensation product thereof; and
   (III) from 1 to 200 parts by weight of an organopolysiloxane containing from 3 to 50 mol % of phenyl group, and with molecular chain terminals blocked with trialkylsiloxy groups and/or functional group-containing silyl groups.

3. A room-temperature curable organopolysiloxane composition comprising:
   (I) 100 parts by weight of an organopolysiloxane that is a condensation reaction product of 100 parts by weight of a component (A) described below, and from 1 to 200 parts by weight of a component (B) described below,
      (A) an organopolysiloxane which comprises from $R_3SiO_{1/2}$ units (wherein, each R represents, independently, an unsubstituted or substituted monovalent hydrocarbon group of 1 to 6 carbon atoms) and $SiO_{4/2}$ units, in which a number of mols of said $R_3SiO_{1/2}$ units relative to 1 mol of said $SiO_{4/2}$ units is from 0.6 to 1.2 mols, and which may further comprise from 0 to 1.0 mols of both $R_2SiO_{2/2}$ units and $RSiO_{3/2}$ units (wherein in each formula, R is as defined above) relative to 1 mol of said $SiO_{4/2}$ units, and moreover comprises less than 2.0% by weight of hydroxyl groups bonded to silicon atoms,
      (B) a diorganopolysiloxane with molecular chain terminals blocked with functional group-containing silyl groups;
   (II) from 0.1 to 30 parts by weight of a silane compound containing two or more hydrolysable groups bonded to silicon atoms within one molecule, and/or a partial hydrolysis-condensation product thereof;and
   (IV) from 1 to 200 parts by weight of an organopolysiloxane containing a group with a polyoxyalkylene structure, with molecular chain terminals blocked with trialkylsiloxy groups and/or functional group-containing silyl groups, and having an HLB value of 1 to 8.

4. A liquid crystal display element produced using a sealant for a liquid crystal display element comprising a room-temperature curable organopolysiloxane composition comprising:

100 parts by weight of an organopolysiloxane that is a condensation reaction product of 100 parts by weight of a component (A) described below, and from 1 to 200 parts by weight of a component (B) described below, (A) an organopolysiloxane which comprises $R_3SiO_{1/2}$ units (wherein, each R represents, independently, an unsubstituted monovalent hydrocarbon group of 1 to 6 carbon atoms) and $SiO_{4/2}$ units, in which a number of mols of said $R_3SiO_{1/2}$ units relative to 1 mol of said $SiO_{4/2}$ units is from 0.6 to 1.2 mols, and which may further comprise from 0 to 1.0 mols of both $R_2SiO_{2/2}$ units and $RSiO_{3/2}$ units (wherein in each formula, R is as defined above) relative to 1 mol of said $SiO_{4/2}$ units, and moreover comprises less than 2.0% by weight of hydroxyl groups bonded to silicon atoms, (B) a diorganopolysiloxane with molecular chain terminals blocked with functional group-containing silyl groups; and (II) from 0.1 to 30 parts by weight of silane compound containing two or more hydrolysable groups bonded to silicon atoms within one molecule, and/or a partial hydrolysis-condensation product thereof.

* * * * *